J. B. STRONG
RAIL SWITCH
Sept. 29, 1931. Re. 18,216
Original Filed Aug. 20, 1930 2 Sheets-Sheet 1
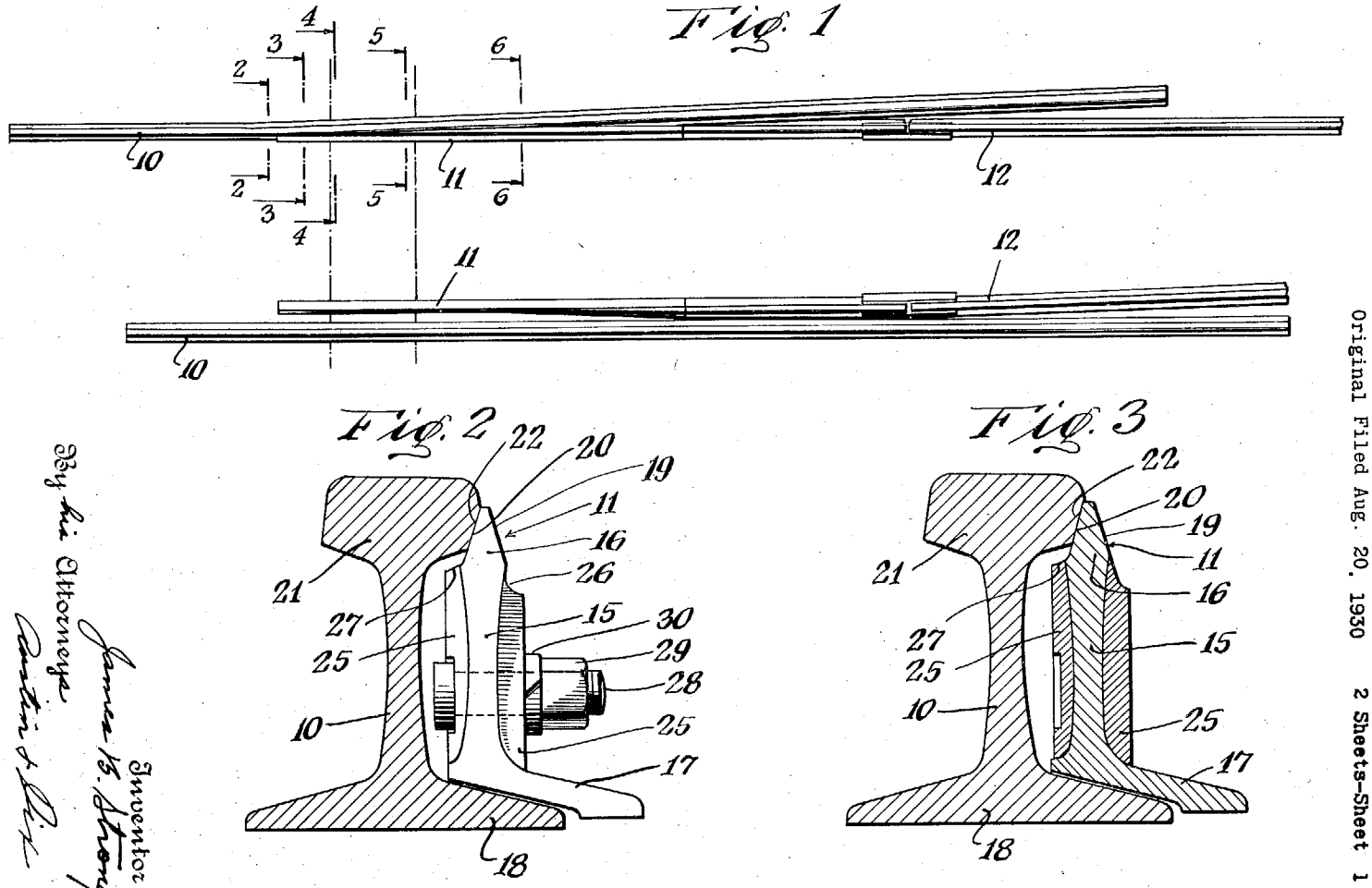
Inventor
James B. Strong
By his Attorneys
Austin & Dix J. B. STRONG
Sept. 29, 1931. RAIL SWITCH Re. 18,216
Original Filed Aug. 20, 1930 2 Sheets-Sheet 2
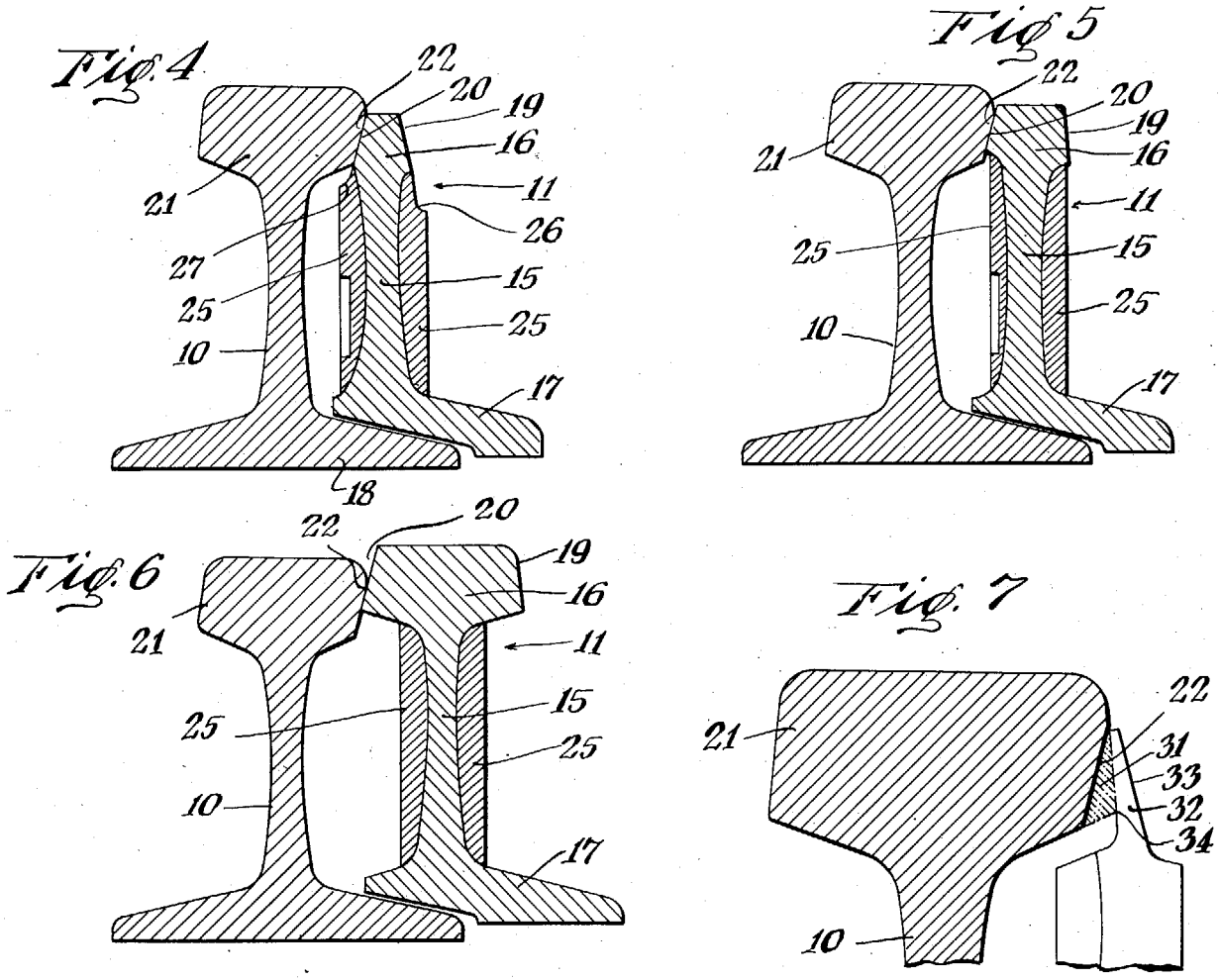
Inventor
James B. Strong
By his Attorneys
Austin & Dix Reissued Sept. 29, 1931

Re. 18,216

UNITED STATES PATENT OFFICE

JAMES B. STRONG, OF NEW YORK, N. Y., ASSIGNOR TO RAMAPO AJAX CORPORATION, OF NEW YORK, N. Y., A CORPORATION OF NEW YORK

RAIL SWITCH

Original No. 1,793,976, dated February 24, 1931, Serial No. 476,477, filed August 20, 1930. Application for reissue filed June 19, 1931. Serial No. 545,579.

This invention relates to switches, and more particularly to a new and improved system of switch point planing by which a switch point of increased strength is obtained.

A switch point constructed in accordance with the present invention, is preferably made from a standard T-rail provided with a head which is cut or beveled on the inside at a substantial angle to the vertical. The switch point is adapted to engage with a stationary rail, preferably made from a standard T-rail having a head which is undercut and provided with a complementary surface adapted to engage the inclined surface of the switch point. The outer surface of the switch point is inclined to engage the flange of a car-wheel and in a preferred form the angles of inclination of the inner and outer surfaces are approximately equal. This provides a comparatively large quantity of metal in the head of the switch point which strengthens the assembly and lessens the liability of the point becoming warped or injured due to frequent contact with the car-wheel. Strengthening members are also preferably provided along the web of the switch point and extend into engagement with the head of the switch point adjacent said inclined surfaces. The construction accordingly provides a substantial quantity of metal in all parts of the switch point and materially increases the strength thereof.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a plan view of the switch constructed in accordance with the present invention;

Fig. 2 is a section taken on the line 2—2 of Fig 1;

Fig. 3 is a section taken on the line 3—3 of Fig. 1;

Fig. 4 is a section taken on the line 4—4 of Fig. 1;

Fig. 5 is a section taken on the line 5—5 of Fig. 1;

Fig. 6 is a section taken on the line 6—6 of Fig. 1; and

Fig. 7 is an enlarged sectional view of a standard rail head showing the amount of undercut and increased metal contained in the improved switch point of the present invention.

Like reference characters denote like parts in the several figures of the drawings.

In the following description and in the claims parts will be identified by specific names for convenience, but they are intended to be as generic in their application to similar parts as the art will permit.

Referring to the drawings more in detail, the invention is shown as applied to a switch comprising a pair of stationary rails 10 of standard T-section and a pair of switch points comprising a pair of movable rails 11 which are connected to rails 12 in any standard manner and are adapted to be thrown into contact with either of the rails 10 in response to suitable actuating mechanism, not shown. Each of the rails 11 comprising a switch point is made from a rail of standard T-section and includes a web portion 15, head 16 and base flange 17. Said base flange is cut away on the bottom to provide a lower surface which extends downwardly in an inclined direction and is adapted to contact with and rest on base 18 of rail 10 when the switch point is in engagement therewith.

Head 16 of the switch point is formed with an outer surface 19 which is inclined to engage the flange of the car-wheel and is provided with an inner surface 20 having a substantial inclination to the vertical opposite to that of surface 19. The inclinations of surfaces 19 and 20 are preferably such that the base of head 16 is of substantial width, preferably in excess of the width of web 15.

Head 21 of rail 10 is provided on the inside and adjacent the free end of the switch point with an undercut surface 22 which is complementary to the inclined surface 20 of the switch point and is adapted to engage the same when the switch is in closed position. The inclinations of surfaces 19 and 20 are preferably equal, although it is obvious that the inclinations may vary in different instances. A particular inclination has been shown by way of illustration and not as a limitation of the present invention. The switch point is so formed that at the free end thereof, as illustrated in Figs. 2 and 3, the top of head 16 is below rail head 21 on which the weight of the car-wheel is carried. Considering successive sections taken along the switch point, however, it is noted that head 16 progressively increases in width, as shown in Figs. 2 to 6, and also increases in elevation with respect to the elevation of rail head 21, so that before the point becomes separated from the main rail the weight of the wheel is entirely supported on head 16 and not by the outer rail 10.

A pair of strengthening members 25 are preferably mounted on the switch point adjacent web 15 and extend upwardly into engagement with head 16. Said members are also provided at their upper edges with inclined surfaces 26 and 27 preferably forming continuations of surfaces 19 and 20 respectively. Said strengthening members may be secured to the web 15 of the switch point in any desired manner as by bolts 28 which are extended through said members and through said web and secured by nuts 29 and lock washers 30.

Referring to Fig. 7 the portion 31 indicates the amount of inclination of the standard rail and the amount of material which must be removed therefrom to form the inclined surface 22. It will be noted that an equivalent amount of material is added to the inner surface of the switch point and serves to materially strengthen the same. A type of switch point commonly used with a standard rail head is provided with a head 32 which has an outer inclined surface 33 similar to surface 19 of head 16, but has an inner surface 34 which is inclined in the same direction as surface 33 and provides a head of extremely thin cross section. It will be noted that the material which is added to the switch point in the above construction more than doubles the cross sectional area thereof at the free end and increases the strength of said switch point by an even greater amount due to the efficient distribution of the metal.

The reenforcing members 25 also cooperate with the enlarged head 16 to form a particularly rigid and firm structure in which the tendency to warp and the possibility of injury is reduced to a minimum.

While certain novel features of the invention have been shown and described and are pointed out in the annexed claims it will be understood that various omissions, substitutions and changes in the forms and details of the device illustrated and in its operation may be made by those skilled in the art without departing from the spirit of the invention.

What is claimed is:

1. A switch structure comprising a switch point, said switch point having an outer inclined surface adapted to contact with a wheel flange and an inner surface oppositely inclined to said first mentioned surface and adapted to contact with a complementary inclined surface on a rail head.

2. A switch structure comprising a switch point having an upper inclined surface adapted to contact with the flange of a car-wheel and an inner surface inclined to the vertical opposite to said first mentioned surface, the angles of inclination of said inner and outer surfaces being substantially equal whereby a substantial quantity of metal is formed therebetween and the strength of the switch point is increased.

3. A switch structure comprising a rail having a rail head, a switch point, said point having an outer inclined surface to receive the flange of a car-wheel and an inner inclined surface forming a substantial angle with said outer surface whereby a substantial quantity of metal is obtained between the base of said surfaces, said rail head having a surface inclined complementary to said inner surface and adapted to engage the same when the switch point is in closed position.

4. A switch point comprising a rail having head and web portions, said head portion having oppositely inclined surfaces and being substantially wider at the base than at the top and strengthening members located adjacent said web section and extending substantially to said head section, said strengthening members having surfaces formed as continuations of said inclined surfaces.

5. A switch structure comprising a rail, a switch point associated therewith and having a head provided with oppositely inclined surfaces, said rail also being provided with a head having a surface complementarily inclined to receive the head of said switch point, said switch point at its free end being lower than said rail and progressive sections of said switch point being progressively wider and higher than said rail until said rail and said switch point separate whereby the weight of the car-wheel is entirely carried by said point prior to the separation thereof from said rail.

6. In combination, a stationary rail, a switch point made from a rail of standard T section and having head, web and flange portions, said head portion at the free end of the switch point starting at the top wearing surface of the head having oppositely inclined surfaces and being substantially wider at the base than at the top, said switch point fitting said stationary rail when in closed position.

7. A switch structure comprising a stationary rail made from a rail of standard T section and having head, web and flange, a switch point made from a rail of standard T section and having head, web and flange, the free end of said switch point head starting at the top wearing surface having oppositely inclined side surfaces and being substantially wider at the base than at the top, said stationary rail head having the part thereof adjacent the free end of said switch point cut away to fit the free end of said switch point and to permit of a substantial amount of material in said free end.

8. A switch structure comprising a stationary rail made from a rail of standard T section and having head, web and flange, a switch point made from a rail of standard T section and having a head, web and flange, said switch point head at the free end of the switch point having oppositely inclined surfaces and being substantially wider at the base than at the top whereby a substantial quantity of metal is obtained between the base of said inclined surfaces, said stationary rail head having that part only which is adjacent the free end of the switch point cut away to form an inclined surface fitting the inner inclined surface of said switch point and adapted to engage the same when the switch point is in closed position.

9. A switch structure comprising a stationary rail having a head, a switch point made from a rail of standard T section and having a head, web and flange, said switch point head having at the free end of the switch point and starting at the top wearing surface oppositely inclined surfaces and being substantially wider at the base than at the top, whereby a substantial quantity of metal is obtained between the base of said inclined surfaces, said stationary rail head having an inclined surface fitting the inner inclined surface of said switch point and adapted to engage the same when the switch point is in closed position, said switch point at its free end being lower than said stationary rail and progressive sections of said switch point being progressively wider and higher than said stationary rail until said stationary rail and said switch point separate whereby the weight of the car-wheel is entirely carried by said point prior to the separation thereof from said stationary rail.

10. A switch structure comprising a stationary rail made from a rail of standard section and having head, web and flange, a switch point made from a rail of standard section and having head, web and flange, the free end of said switch point head having opposite inclined side surfaces and being substantially wider at the base than at the top, said stationary rail head having the part thereof adjacent the free end of said switch point cut away to fit the free end of said switch point and to permit of a substantial amount of material in said free end.

In testimony whereof I have hereunto set my hand.

JAMES B. STRONG.